United States Patent [19]

Hawkins et al.

[11] Patent Number: 5,067,786

[45] Date of Patent: Nov. 26, 1991

[54] OPTICAL FIBRE MONITORING

[75] Inventors: Ronald G. Hawkins, Harlow; Richard Grigsby, Chester, both of England

[73] Assignee: BICC Public Limited Company, London, England

[21] Appl. No.: 623,201

[22] Filed: Dec. 5, 1990

[30] Foreign Application Priority Data

Dec. 21, 1989 [GB] United Kingdom ............... 8928825

[51] Int. Cl.$^5$ .......................................... G02B 6/26
[52] U.S. Cl. ................................... 385/13; 356/73.1; 250/227.16
[58] Field of Search ............ 350/96.15, 96.18, 96.19; 250/227.14, 227.15, 227.16; 356/73.1

[56] References Cited

U.S. PATENT DOCUMENTS

| | | | |
|---|---|---|---|
| 4,586,783 | 5/1986 | Campbell et al. | 350/96.15 |
| 4,666,541 | 5/1987 | Le Noane et al. | 156/158 |
| 4,671,653 | 6/1987 | So et al. | 356/73.1 |
| 4,672,198 | 6/1987 | Presby | 250/227 |
| 4,741,585 | 5/1988 | Uken | 350/96.15 |
| 4,759,605 | 7/1988 | Shen et al. | 350/96.15 |
| 4,775,233 | 10/1988 | Kaneshi et al. | 356/73.1 |
| 4,822,125 | 4/1989 | Beals et al. | 350/96.15 |
| 4,834,482 | 5/1989 | Campbell et al. | 350/96.15 |
| 4,961,620 | 10/1990 | Uken et al. | 350/96.15 |

FOREIGN PATENT DOCUMENTS

| | | |
|---|---|---|
| 0190922 | 8/1986 | European Pat. Off. . |
| 0230938 | 8/1987 | European Pat. Off. . |
| 0240100 | 10/1987 | European Pat. Off. . |
| 0291962 | 11/1988 | European Pat. Off. . |
| 2186994 | 8/1987 | United Kingdom . |
| 2210685 | 6/1989 | United Kingdom . |

*Primary Examiner*—Frank Gonzalez
*Attorney, Agent, or Firm*—Oliff & Berridge

[57] ABSTRACT

A handtool for detecting whether or not an optical fibre is carrying a light signal includes a motor-driven operating mechanism mounted in the tool housing for causing a pressure member to move towards or away from an anvil so that when the pressure member is caused to move towards the anvil an optical fibre positioned between the pressure member and the anvil will be subjected to microbending of a gradually increasing extent. The motor-driven operating mechanism preferably comprises a screw-threaded shaft supported in the housing and rotatably driven about its axis by the motor in either rotational direction.

10 Claims, 2 Drawing Sheets

OPTICAL FIBRE MONITORING

This invention relates to the monitoring of optical fibres and is particularly concerned with apparatus for detecting whether or not an optical fibre is carrying a light signal.

In the specification of our co-pending Patent Application No: 8922079.2 (Serial No: 2226128A) there is described and claimed improved apparatus for detecting whether or not an optical fibre is carrying a light signal, which improved apparatus can be used without causing undue disruption of the signal if one is present. This improved apparatus comprises bending means for subjecting at least a portion of an optical fibre to microbending of a gradually increasing extent; first detecting means for detecting light escaping from the fibre; and, operatively coupled to the first detecting means and to the bending means, a control unit which will give an output indication on receipt of a signal from the first detecting means that light escaping from the fibre has been detected and which, on receipt of said signal, will stop the bending means from further increasing the extent of microbending of said portion of the fibre.

A preferred embodiment of the improved apparatus of our aforesaid co-pending patent application comprises first bending means for subjecting at least a portion of an optical fibre to microbending of a gradually increasing extent; second bending means for causing a second portion of the optical fibre to be subjected to macrobending to a predetermined fixed extent, the extent of macrobending being insufficient, by itself, to cause a substantial amount of light to escape from the optical fibre; first detecting mean for detecting light escaping from the fibre, the first detecting means being in the location of the second bending means; and, operatively coupled to the first detecting means and to the first bending means, a control unit which will give an output indication on receipt of a signal from the first detecting means that light escaping from the fibre has been detected and which, on receipt of said signal, will stop the first bending means from further increasing the extent of microbending of said portion of the fibre.

It is an object of the present invention to provide a modification of the preferred embodiment of the improved apparatus of our aforesaid co-pending patent application in the form of a handtool for detecting whether or not an optical fibre is carrying a light signal, which handtool can be readily manufactured in quantity and can be readily used in the field without causing undue disruption of a signal in an optical fibre if one is present.

According to the invention, the handtool comprises a housing of such a shape and size that it can be held in the hand; first bending means for subjecting a first portion of an optical fibre to microbending of a gradually increasing extent, which first bending means comprises an anvil fixedly secured in the housing, a pressure member so mounted in the housing that the pressure member is constrained to move towards or away from a face of the anvil in a rectilinear direction substantially normal to said face, said face of the anvil and/or the pressure-imparting face of the pressure member including one or more than one undulation, and a motor-driven operating mechanism mounted in the housing for causing the pressure member to move towards or away from the anvil so that when said first portion of an optical fibre is positioned between the pressure member and the anvil and the pressure member is caused to move towards the anvil said first portion of the optical fibre will be constrained between the anvil and the pressure member and will be subjected to microbending of a gradually increasing extent; second bending means which is fixedly secured in the housing adjacent the anvil and which will cause a second portion of said optical fibre to be subjected to macrobending to a predetermined fixed extent; first detecting means for detecting light escaping from the fibre, the first detecting means being mounted in the housing in the vicinity of the second bending means; second detecting means mounted in the housing for detecting when said first portion of the fibre has been subjected to a predetermined amount of microbending; and, operatively coupled to the first and second detecting means and to the motor driving the operating mechanism of the first bending means, a control unit which will give a first output indication on receipt of a signal from the first detecting means, the arrangement being such that, on receipt of a signal from the first detecting means, the control unit will stop the motor causing said movement of the pressure member towards the anvil to prevent further increase of the extent of microbending of said first portion of the fibre and that, if the second detecting means detects that said first portion of the fibre has been subjected to its predetermined maximum amount of microbending and no signal has been received from the first detecting means, a signal is sent to the control unit which will stop the motor causing said movement of the pressure member towards the anvil to prevent further increase in the extent of microbending of said first portion of the fibre and will give a second output indication.

The motor-driven operating mechanism of the handtool preferably comprises a screw-threaded shaft which is so supported in the housing that it extends in a direction substantially parallel to the direction of motion of the pressure member and which can be rotatably driven about its axis by said motor in either rotational direction; two stops in screw-threaded engagement with and longitudinally spaced on the shaft a predetermined fixed distance apart; a substantially rigid elongate member which is secured to and extends from the pressure member in a direction substantially parallel to the shaft and which is so keyed to the stop nearer the pressure member that, when the shaft is rotatably driven about its axis, said elongate member is restrained against rotational movement and said elongate member and said longitudinally spaced stops are constrained to move in said direction with respect to the shaft, the elongate member having an end wall extending transversely of the shaft intermediate of said stops; and a coil spring which surrounds the shaft and extends between and is secured at its ends to said transversely extending end wall and the stop nearer the pressure member. The arrangement is such that, as the shaft is rotatably driven by the motor in one rotational direction, initially the elongate member and the longitudinally spaced stops are constrained to move with respect to the shaft in such a direction that the pressure member is caused to move towards the anvil until it abuts the first portion of an optical fibre disposed between the anvil and pressure member, and, thereafter, as rotation of the shaft continues, the coil spring extending between said transversely extending end wall and the stop nearer the pressure member is gradually compressed, thereby to subject said first portion of the optical fibre to a gradually increasing pressure and, hence, to microbending of a gradually increasing extent. On receipt of a signal from the first detecting means, the control unit of the handtool will stop the motor rotatably driving the shaft to prevent further compression of the coil spring and hence further increase of the extent of microbending of said first portion of the optical fibre and, subsequently, the control unit will cause the motor to drive the shaft in the opposite rotational direction, initially, to cause the longitudinally spaced stops to move with respect to the rotatably driven shaft in the opposite direction until the pressure to which said first portion of the optional fibre is subjected is substantially zero and, thereafter, the longitudinally spaced stops and the elongate member will continue to move in said opposite direction so that the pressure member moves away from the anvil to enable the optical fibre to be removed and replaced by another optical fibre. If the second detecting means detects that the fibre has been subjected to a predetermined maximum pressure and, hence, to a predetermined maximum amount of microbending and no signal has been received from the first detecting means, then a signal is sent to the control unit which will stop the motor rotatably driving the shaft and hence will prevent further increase in the extent of of microbending of said first portion of the fibre and will give a second output indication. Subsequently, as previously described, the control unit will cause the motor t drive the shaft in the opposite rotational direction to cause the pressure member to move away from the anvil and enable the optical fibre to be removed and replaced by another optical fibre.

Preferably, if the second detecting means detects that the fibre has been subjected to a predetermined maximum pressure and, hence, to its predetermined maximum amount of microbending and no signal has been received from the first detecting means, the motor is stopped and said first portion of the optical fibre is subjected to said maximum pressure and, hence, to its predetermined maximum amount of microbending for a predetermined period of time, for example 3 seconds, before the motor is caused to drive the shaft in the opposite rotational direction to relieve the pressure on said first portion of the optical fibre.

Preferably, also, as the coil spring is being gradually compressed and at a position at which the pressure to which said first portion of an optical fibre and hence the extent of microbending is insufficient for a signal to be detected by the first detecting means, movement of the longitudinally spaced stops is temporarily arrested for a predetermined period of time, for example approximately 1 second, sufficient to enable the electronics of the handtool to be automatically calibrated, thereby to compensate for any drift that may have resulted from changes in temperature or other causes.

It will be appreciated that the pressure to which a first portion of an optical fibre will be subjected will depend upon the material and dimensions of the coil spring. We have found that, for an optical fibre of the kind currently used in optical transmission cables, a coil spring is employed which will impart a predetermined maximum pressure of approximately 900 grammes on a first portion of an optical fibre when constrained between the anvil and pressure member. In this case, automatic calibration of the electronics of the handtool preferably is effected when the pressure on said first portion of an optical fibre is approximately 200 grammes.

Each of the stops preferably is releasably locked on the shaft so that the fixed distance between them can be adjusted as may be required to set a predetermined maximum pressure, and hence a predetermined maximum extent of microbending, to which an optical fibre is to be subjected using a coil spring of a particular material and of particular dimensions.

Preferably, to ensure that a light signal can be detected in an optical fibre constrained between the anvil and pressure member of the first bending means regardless of the direction of travel of the signal along the fibre, the handtool includes two second bending means which are fixedly secured in the housing adjacent transversely opposite sides of the anvil, each of which second bending means will cause one of two second portions of said optical fibre to be subjected to macrobending to a predetermined fixed extent, a first detecting means being mounted in the housing in the vicinity of each second bending means. In a preferred embodiment, the anvil and said two second bending means are parts of a single plate of glass having an edge of a smoothly curved arcuate shape, a central part of said curved edge constituting the anvil and adjoining parts of said edge on opposite sides of the anvil constituting the two second bending means.

The pressure member preferably is secured in a carriage which is separately formed with respect to the pressure member and which is so mounted in the housing that the carriage, and hence the pressure member secured therein, is constrained to move towards or away from said face of the anvil in said rectilinear direction substantially normal to said face. Preferably, also, the carriage also carries on transversely opposite sides of the pressure member bodies of rubber or rubber-like material which, when the pressure member imparts pressure on said first portion of an optical fibre constrained between the anvil and the pressure member, will press said second portions of the fibre against the two second bending means. The pressure member preferably is adjustably secured in the carriage in such a way that the position of the pressure member with respect to the carriage can be adjusted to and locked in any one of a limited number of positions lying along a line substantially parallel to the direction of motion of the carriage.

The invention is further illustrated by a description, by way of example, of a preferred handtool for detecting whether or not an optical fibre is carrying a light signal, with reference to the accompanying drawings, in which.

Figure 1:
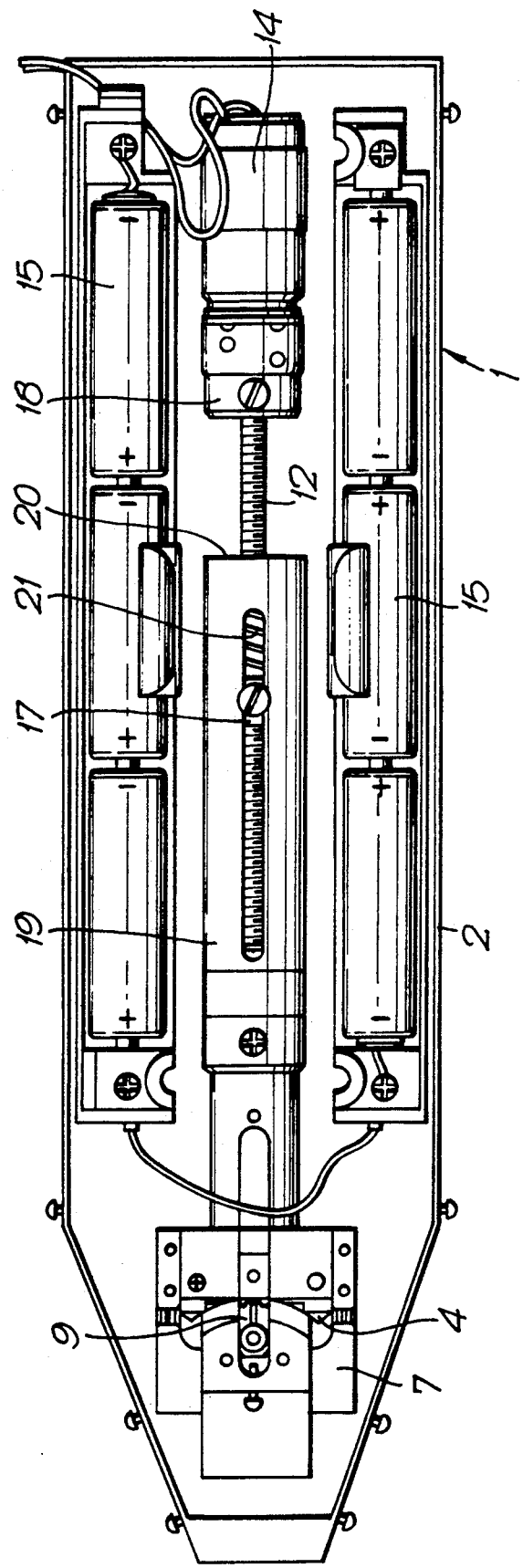
FIG. 1 shows a plan view of the preferred handtool with the lid removed and with the pressure member bearing directly against the anvil.

Referring to the drawings, the preferred handtool comprises a housing 1 comprising a box 2 and a detachable lid (not shown), the housing being of such an elongate shape and size that it can be held in the hand. Fixedly secured near one end of the box 2 is an anvil 4 having a face 5 towards or away from which a carriage 7 is constrained to move in a rectilinear direction normal to the face 5. A pressure member 9, which is separately formed with respect to the carriage 7, is adjustably secured in the carriage and has a pressure-imparting face 10 which includes a plurality of undulations. The combination of the anvil 4 and movable pressure member 9 constitutes first bending means for subjecting a first portion of an optical fibre F disposed between the anvil and the pressure member to microbending of a gradually increasing extent. The pressure member 9 is so adjustably mounted in the carriage 7 that the position of the pressure member with respect to the carriage can be adjusted and locked in any one of a limited number of positions lying along a line parallel to the direction of motion of the carriage.

Movement of the carriage 7, and hence of the pressure member 9, towards or away from the anvil 4 can be effected by a motor-driven operating mechanism comprising a screw-threaded shaft 12 which is so supported in the box 2 that it extends in a direction parallel to the direction of motion of the carriage 7 and which can be rotatably driven about its axis in either rotational direction by a motor 14 powered by batteries 15. Two stops 17 and 18 are in screw-threaded engagement with and longitudinally spaced on the shaft 12 and can be adjustably locked a predetermined fixed distance apart and a rigid arm 19 is secured to and extends from the carriage 7 in a direction parallel to the shaft and is so keyed to the stop 17 that, when the shaft is rotatably driven about its axis, the art is restrained against rotational movement and the arm and the stops are constrained to move with respect to the shaft. The rigid arm 19 has an end wall 20 remote from the pressure member 9 through which the shaft 12 passes and a coil spring 21 surrounds the shaft and extends between and is secured at its ends to the end wall 20 and the stop 17.

Figure 2:
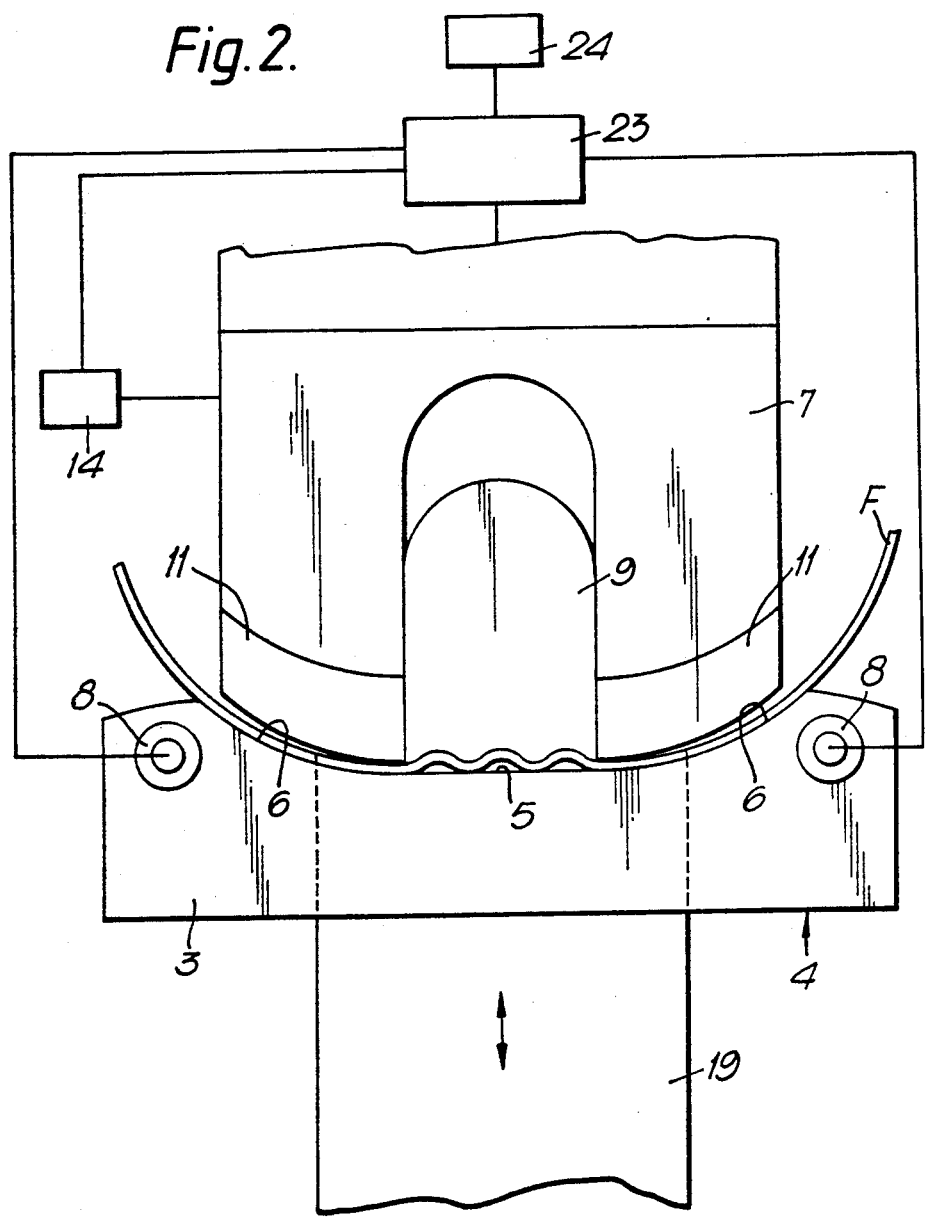
FIG. 2 is a fragmental schematic diagram of the preferred handtool shown in FIG. 1 with an optical fibre positioned between the pressure member and anvil.
Figure 3:
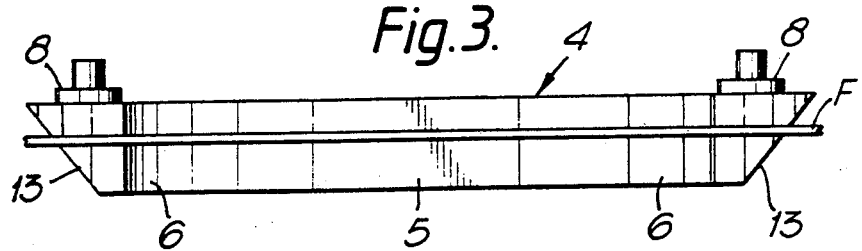
FIG. 3 is a front view of the anvil of the preferred handtool shown in FIG. 2.

The anvil 4 is constituted by a central part of an edge of a plate 3 of glass (FIGS. 2 and 3), adjoining parts 6 of the edge on opposite sides of the anvil being of smoothly curved arcuate shape and constituting two second bending means for subjecting second portions of the optical fibre F to macrobending of a predetermined fixed extent. Each of the second bending means 6 is operatively coupled to a control unit 23 (FIG. 2) via a photodetector 8 which is mounted on the glass plate 3 in the vicinity of the second bending means. The control unit 23 includes three microswitches (not shown) indirectly operated in sequence by one of the stops 17,18 on the motor-driven shaft 12, the first of which microswitches, when the pressure member 9 is spaced sufficiently from the anvil 4 to permit introduction of an optical fibre, being actuated to cause electronics of the tool to reverse the motor 14 and so drive the shaft in such a rotational direction as to cause the pressure head to move towards the anvil. When the pressure member 9 initially comes into contact with the first portion of the optical fibre F, the second microswitch is actuated to cause the electronics of the tool to arrest temporarily movement of the pressure member to enable the electronics of the tool to be automatically calibrated. The third microswitch of the control unit constitutes the second detecting means and is actuated to cause the electronics of the tool to stop the motor 14 rotatably driving the shaft 12 if the optical fibre F has been subjected to a predetermined maximum pressure and, hence to a predetermined maximum amount of microbending, and no signal has been received from a photodetector 8.

With the exception of the edge 5, 6 of the glass plate 3 and the part of the glass plate underlying the photodetectors 8, all surfaces of the plate are silvered to seal the glass plate against the ingress of ambient light. A light signal emerging from one of the second portions of the optical fibre F and passing through the second bending means 6 into the plate is reflected by one of two oblique faces 13 of the plate to the adjacent photodetector 8. The electronics of the control unit 23 is also operatively coupled to a display 24. The 24 may be a plurality of lamps mounted in the housing 1 and visible through the lid, each lamp being associated with a condition detected by the handtool, e.g. signal present on fibre, no signal present on fibre, modulation signal detected, self-test fail and battery low, and each lamp being of a colour different to and readily distinguished from that of each of the other lamps.

The carriage 7 carries on transversely opposite sides of the pressure member 9 bodies 11 of rubber or rubber-like material which, when the pressure member is caused to impart pressure on the first portion of the optical fibre F disposed between the anvil 4 and the pressure member, will press the second portions of the fibre against the two second bending means 6. Each rubber body 11 has a face having a radius of curvature slightly less than that of the associated second bending means 6 so that, as the pressure member 9 is caused to move towards the anvil, each second portion of the optical fibre F is positively and progressively constrained against the second bending means.

The macrobends to which the second portions of the optical fibre F are subjected by the second bending means 6 are of sufficiently large radius that, without the microbending caused by the pressure member 9 and anvil 4, any light signal in the fibre would not be disrupted. The provision of two second bending means 6 for producing macrobends in the optical fibre F and two photodetectors 8 has the advantage that a light signal if present can be detected regardless of its direction of travel along the fibre.

In use, an optical fibre F is disposed between the anvil 4 and the undulating face 10 of the movable pressure member 9 and the screw-threaded shaft 12 is driven by the motor 14 in the appropriate rotational direction to cause the rigid arm 19 and the longitudinally spaced stops 17 and 18 to move with respect to the shaft 12 in such a direction that the carriage 7, and hence the pressure member 9, is caused to move towards the anvil 4 until the undulating face 10 of the pressure member abuts the first portion of the optical fibre F disposed between the anvil and the pressure member. Thereafter, as rotation of the shaft 12 continues, the coil spring 21 extending between the transversely extending end wall 20 and the stop 17 is gradually compressed, thereby to subject the first portion of the optical fibre F to a gradually increasing pressure and, hence, to microbending of a gradually increasing extent. If there is a light signal on the optical fibre F, the gradually increasing pressure imparted by the pressure member 9 will begin to disturb the transmission properties of the fibre, causing light to leak from the fibre into its cladding due to microbending. This light will emerge from the cladding of the fibre F in the region of one of the second bending means 6 (depending upon the direction of travel of the light signal in the fibre) and escaping light will be detected by the associated photodetector 8 which will send a signal to the control unit 23. On receipt of a signal from the photodetector 8, the control unit 23 will stop the motor 14 driving the shaft 12 to prevent further compression of the coil spring 21 and hence further increase of the extent of microbending of the first portion of the optical fibre F and, subsequently, the control unit will cause the motor to drive the shaft in the opposite rotational direction, initially to cause the longitudinally spaced stops 17 and 18 to move with respect to the rotatably driven shaft 12 in the opposite direction until the pressure to which the first portion of the optical fibre is subjected is substantially zero and, thereafter, the longitudinally spaced stops and the rigid arm will continue to move in this opposite direction so that the carriage 7, and hence the pressure member 9, move away from the anvil 4 to enable the optical fibre F to be removed and replaced by another optical fibre.

As the coil spring 21 is being gradually compressed and at a position at which the pressure member 9 initially comes into contact with the first portion of the optical fibre F and hence the extent of microbending is insufficient for a signal to be detected by a photodetector 8, movement of the pressure head is temporarily arrested for a predetermined period of time of approximately one second to enable the electronics of the handtool to be automatically calibrated, thereby to compensate for any drift that may otherwise result from changes in temperature or other causes.

If the the optical fibre F has been subjected to a predetermined maximum pressure and, hence, to a predetermined maximum amount of microbending and no signal has been received from a photodetector 8, then the third microswitch of the control unit constituting the second detecting means will actuate to stop the motor 14 rotatably driving the shaft 12 and so prevent further increase in the extent of microbending of the first portion of the fibre; an appropriate signal is also sent to the display 24. When the motor has stopped, the first portion of the optical fibre F is subjected to this maximum pressure and, hence, to its predetermined maximum amount of microbending, for a predetermined period of time of approximately three seconds before the motor is caused to drive the shaft in the opposite rotational direction to relieve the pressure on the first portion of the optical fibre as previously described.

What we claim as our invention is:

1. A handtool for detecting whether or not an optical fibre is carrying a light signal, which handtool comprises a housing of such a shape and size that it can be held in the hand; first bending means for subjecting a first portion of an optical fibre to microbending of a gradually increasing extent, which first bending means comprises an anvil fixedly secured in the housing, a pressure member so mounted in the housing that the pressure member is constrained to move towards or away from a face of the anvil in a rectilinear direction substantially normal to said face, at least one of said face of the anvil and a pressure-imparting face of the pressure member including at least one undulation, and a motor-driven operating mechanism mounted in the housing for causing the pressure member to move towards or away from the anvil so that when said first portion of an optical fibre is positioned between the pressure member and the anvil and the pressure member is caused to move towards the anvil said first portion of the optical fibre will be constrained between the anvil and the pressure member and will be subjected to microbending of a gradually increasing extent; second bending means which is fixedly secured in the housing adjacent the anvil and which will cause a second portion of said optical fibre to be subjected to macrobending to a predetermined fixed extent; first detecting means for detecting light escaping from the fibre, the first detecting means being mounted in the housing in the vicinity of the second bending means second detecting means mounted in the housing for detecting when said first portion of the fibre has been subjected to a predetermined amount of microbending; and, operatively coupled to the first and second detecting means and to the motor driving the operating mechanism of the first bending means, a control unit which will give a first output indication on receipt of a signal from the first detecting means, the arrangement being such that, on receipt of a signal from the first detecting means, the control unit will stop the motor causing said movement of the pressure member towards the anvil to prevent further increase of the extent of microbending of said first portion of the fibre and that, if the second detecting means detects that said first portion of the fibre has been subjected to its predetermined maximum amount of microbending and no signal has been received from the first detecting means, a signal is sent to the control unit which will stop the motor causing said movement of the pressure member towards the anvil to prevent further increase in the extent of microbending of said first portion of the fibre and will give a second output indication.

2. A handtool as claimed in claim 1, wherein the motor-driven operating mechanism comprises a screw-threaded shaft which is so supported in the housing that it extends in a direction substantially parallel to the direction of motion of the pressure member and which can be rotatably driven about its axis by said motor in either rotational direction; two stops in screw-threaded engagement with and longitudinally spaced on the shaft a predetermined fixed distance apart; a substantially rigid elongate member which is secured to and extends from the pressure member in a direction substantially parallel to the shaft and which is so keyed to the stop nearer the pressure member that, when the shaft is rotationably driven about its axis, said elongate member is restrained against rotational movement and said elongate member and said longitudinally spaced stops are constrained to move in said direction with respect to the shaft, the elongate member having an end wall extending transversely of the shaft intermediate of said stops; and a coil spring which surrounds the shaft and extends between and is secured at its ends to said transversely extending end wall and the stop nearer the pressure member, the arrangement being such that, as the shaft is rotatably driven by the motor in one rotational direction, the elongate member and the longitudinally spaced stops are constrained to move with respect to the shaft in such a direction that the pressure member is caused to move towards the anvil initially until it abuts the first portion of an optical fibre disposed between the anvil and pressure member, and, thereafter, as the coil spring extending between said transversely extending end wall and the stop nearer the pressure member is gradually compressed, thereby to subject said first portion of the optical fibre to a gradually increasing pressure and, hence, to microbending of a gradually increasing extent, on receipt of a signal from the first detecting means, the control unit will stop the motor rotatably driving the shaft to prevent further compression of the coil spring, will cause the motor to drive the shaft in the opposite rotational direction to cause the longitudinally spaced stops to move with respect to the rotatably driven shaft in the opposite direction, initially until the pressure to which said first portion of optical fibre is subjected is substantially zero and, thereafter, until the pressure member has moved away from the anvil sufficiently to enable the optical fibre to be removed; and that, if the second detecting means detects that said first portion of the fibre has been subjected to its predetermined maximum amount of microbending and no signal has been received from the first detecting means, a signal is sent to the control unit which will stop the motor rotatably driving the shaft and will cause the motor to drive the shaft in the opposite rotational direction to cause the pressure member to move away from the anvil sufficiently to enable the optical fibre to be removed.

3. A handtool as claimed in claim 2, wherein, if the second detecting means detects that the fibre has been subjected to a predetermined maximum pressure and, hence to its predetermined maximum amount of microbending and no signal has been received from the first detecting means, the control unit will cause the motor to stop for a predetermined period of time so that said first portion of the optical fibre will be subjected to said maximum pressure and, hence, to its predetermined maximum amount of microbending for said predetermined period of time before the control unit causes the motor to drive the shaft in the opposite rotational direction to relieve the pressure on said first portion of the optical fibre.

4. A handtool as claimed in claim 2, wherein, as the coil spring is being gradually compressed and at a position at which the pressure to which said first portion of an optical fibre and hence the extent of microbending is insufficient for a signal to be detected by the first detecting means, the control unit will cause movement of the longitudinally spaced stops to be temporarily arrested for a predetermined period of time sufficient to enable the electronics of the handtool to be automatically calibrated, thereby to compensate for any drift that may have resulted from changes in temperature or other causes.

5. A handtool as claimed in claim 2, wherein each of the stops is releasably locked on the shaft so that the fixed distance between them can be adjusted as may be required to set a predetermined maximum pressure, and hence a predetermined extent of microbending, to which an optical fibre is to be subjected.

6. A handtool as claimed in claim 1, wherein the handtool includes two second bending means which are fixedly secured in the housing adjacent transversely opposite sides of the anvil, each of which second bending means will cause one of two second portions of said optical fibre to be subjected to macrobending to a predetermined fixed extent, a first detecting means being mounted in the housing in the vicinity of each second bending means.

7. A handtool as claimed in claim 6, wherein the anvil and said two second bending means are parts of a single plate of glass having an edge of a smoothly curved arcuate shape, a central part of said curved edge constituting the anvil and adjoining parts of said edge on opposite sides of the anvil constituting the two second bending means.

8. A handtool as claimed in claim 1, wherein the pressure member is secured in a carriage which is separately formed with respect to the pressure member and which is so mounted in the housing that the carriage, and hence the pressure member secured therein, is constrained to move towards or away from said face of the anvil in said rectilinear direction substantially normal to said face.

9. A handtool as claimed in claim 8, wherein the carriage also carries on transversely opposite sides of the pressure member bodies of readily compressible material which, when the pressure member imparts pressure on said first portion of an optical fibre constrained between the anvil and the pressure member, will press said second portions of the fibre against the two second bending means.

10. A handtool as claimed in claim 8, wherein the pressure member is adjustably secured in the carriage in such a way that the position of the pressure member with respect to the carriage can be adjusted to and locked in one of a limited number of positions lying along a line substantially parallel to the direction of motion of the carriage.

* * * * *